US008189609B2

(12) United States Patent
Bouthemy et al.

(10) Patent No.: US 8,189,609 B2
(45) Date of Patent: May 29, 2012

(54) INTER-CARRIER MANAGEMENT OF MESSAGING GROUPS

(75) Inventors: Jean-Luc René Bouthemy, Sammamish, WA (US); Robbie Bikdash, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 626 days.

(21) Appl. No.: 12/346,744

(22) Filed: Dec. 30, 2008

(65) Prior Publication Data

US 2010/0167763 A1 Jul. 1, 2010

(51) Int. Cl.
*H04J 3/26* (2006.01)

(52) U.S. Cl. .......................... 370/432; 455/466; 709/203

(58) Field of Classification Search .................. 370/432; 455/466, 517–519; 709/203

See application file for complete search history.

(56) References Cited

U.S. PATENT DOCUMENTS

| | | | | |
|---|---|---|---|---|
| 7,224,957 | B2 | 5/2007 | Spector | |
| 7,251,495 | B2 | 7/2007 | Keyani et al. | |
| 2003/0093462 | A1* | 5/2003 | Koskelainen et al. | 709/203 |
| 2003/0139193 | A1 | 7/2003 | Buckley | |
| 2004/0117444 | A1 | 6/2004 | Goodman et al. | |
| 2004/0203610 | A1 | 10/2004 | Deeds | |
| 2005/0117604 | A1 | 6/2005 | Villefrance et al. | |
| 2005/0136952 | A1 | 6/2005 | Zabawskyj et al. | |
| 2005/0143106 | A1 | 6/2005 | Chan et al. | |
| 2006/0111135 | A1* | 5/2006 | Gray et al. | 455/519 |
| 2006/0168087 | A1 | 7/2006 | Lescuyer et al. | |
| 2007/0050488 | A1 | 3/2007 | Joyner et al. | |
| 2007/0076677 | A1 | 4/2007 | Batariere et al. | |
| 2007/0117578 | A1 | 5/2007 | Yim et al. | |
| 2008/0270558 | A1* | 10/2008 | Ma | 709/206 |

FOREIGN PATENT DOCUMENTS

| | | | |
|---|---|---|---|
| KR | 100756448 | A | 8/2007 |
| WO | WO-2007089383 | A2 | 8/2007 |
| WO | WO-2007107628 | A1 | 9/2007 |

OTHER PUBLICATIONS

International Search Report and Written Opinion, International Application No. PCT/US2009/066886, Filed on Dec. 4, 2009, Mailed on Jul. 20, 2010, 8 pages.

* cited by examiner

*Primary Examiner* — Luat Phung

(57) ABSTRACT

A system and method to enable the efficient distribution of group messages sent from a mobile device that receives service from one telecommunications carrier, to groups of mobile devices that receive service from one or more other telecommunications carriers. A mobile device user or system operator generates a group distribution list for messages that are to be sent to two or more other users. The group distribution list is provided to a message distribution system that is comprised of distribution agents that are associated with each telecommunications carrier. Each distribution agent is responsible for routing a group message to those mobile devices that receive service from the associated telecommunications carrier.

17 Claims, 8 Drawing Sheets

400

| | | | |
|---|---|---|---|
| Group ID (405) | 1234567890 | | |
| Group Nickname (410) | Volleyball Team | | |
| | 420 | 425 | 430 |
| Member 1 | Alicia Alex | 206-555-1212 | Carrier A |
| Member 2 | Bart Brown | 425-555-1234 | Carrier A |
| Member 3 | Chris Charles | c.charles@domain3 | Carrier A |
| Member 4 | Dave Douglas | 800-245-8759 | Carrier B |
| Member 5 | Elliott Elsworth | e.elsworth@domain5 | Carrier B |
| Member 6 | Frank Friedland | 123-456-7890 | Carrier C |
| ... | ... | ... | ... |
| Member N | | | |

415 (Member 1 – Member N)

| | | | | |
|---|---|---|---|---|
| 405 | Group ID | 1234567890 | | |
| 410 | Group Nickname | Volleyball Team | | |
| 455 | Distribution Agent | Carrier A | | |
| 415 | Member 4 | Dave Douglas | 800-245-8759 | Carrier B |
| | Member 5 | Elliott Elsworth | e.elsworth@domain5 | Carrier B |

| | | | | |
|---|---|---|---|---|
| 405 | Group ID | 1234567890 | | |
| 410 | Group Nickname | Volleyball Team | | |
| 455 | Distribution Agent | Carrier A | | |
| 415 | Member 6 | Frank Friedland | 123-456-7890 | Carrier C |

*FIG. 4C*

INTER-CARRIER MANAGEMENT OF MESSAGING GROUPS

BACKGROUND

As mobile devices have become ubiquitous, the use of mobile devices to send text, photos, video, and other messages has grown exponentially. For example, some user demographics use instant messaging (IM) or texting applications on their mobile phones more often than they use their phones for making voice calls. A user may prefer sending messages to another user because it allows the other user to respond to the message when convenient. A user may also prefer sending messages to another user because the content of the message may be of low priority and not require an immediate response.

As messaging has increased, the type of messaging has changed. Whereas messaging started as primarily a one-to-one communication method that allowed one user to exchange information with another user, messaging has quickly grown to become a one-to-many communication method. In one-to-many communications, a single user sends a message to two or more other users. Recipients of the message may respond directly to the sender, or may send a response to the entire group for consideration. Such group messaging has become increasingly popular in order to allow social networks of individuals, such as friends, families, or workplace colleagues to stay in touch with one another.

In order to accommodate the rapidly expanding number of messages on telecommunications networks, telecommunications carriers have been required to quickly build out their network infrastructure. Maintaining the necessary routers, switches, billing systems, customer service support, and other network elements required to transmit messages between senders and recipients has proven to be a difficult task. As network traffic has scaled, it has been challenging to build out infrastructure in a timely fashion to handle the increasing number of messages. The popularity of group messaging has only exacerbated this problem. Because a group message may be sent to a large number of individuals, and because each individual may easily respond to all members in the group, the number of messages sent between users quickly grows exponentially larger. In order to accommodate this growth, providers of telecommunications services have been forced to look for strategies that allow the network messaging burden to be reduced, while at the same time continuing to provide high quality and readily-available messaging services to its users.

BRIEF DESCRIPTION OF THE DRAWINGS

FIGS. 4A-4C are representative group identification records that are maintained at home and remote distribution agents to enable routing of messages to groups of users.

DETAILED DESCRIPTION

Figure 1:
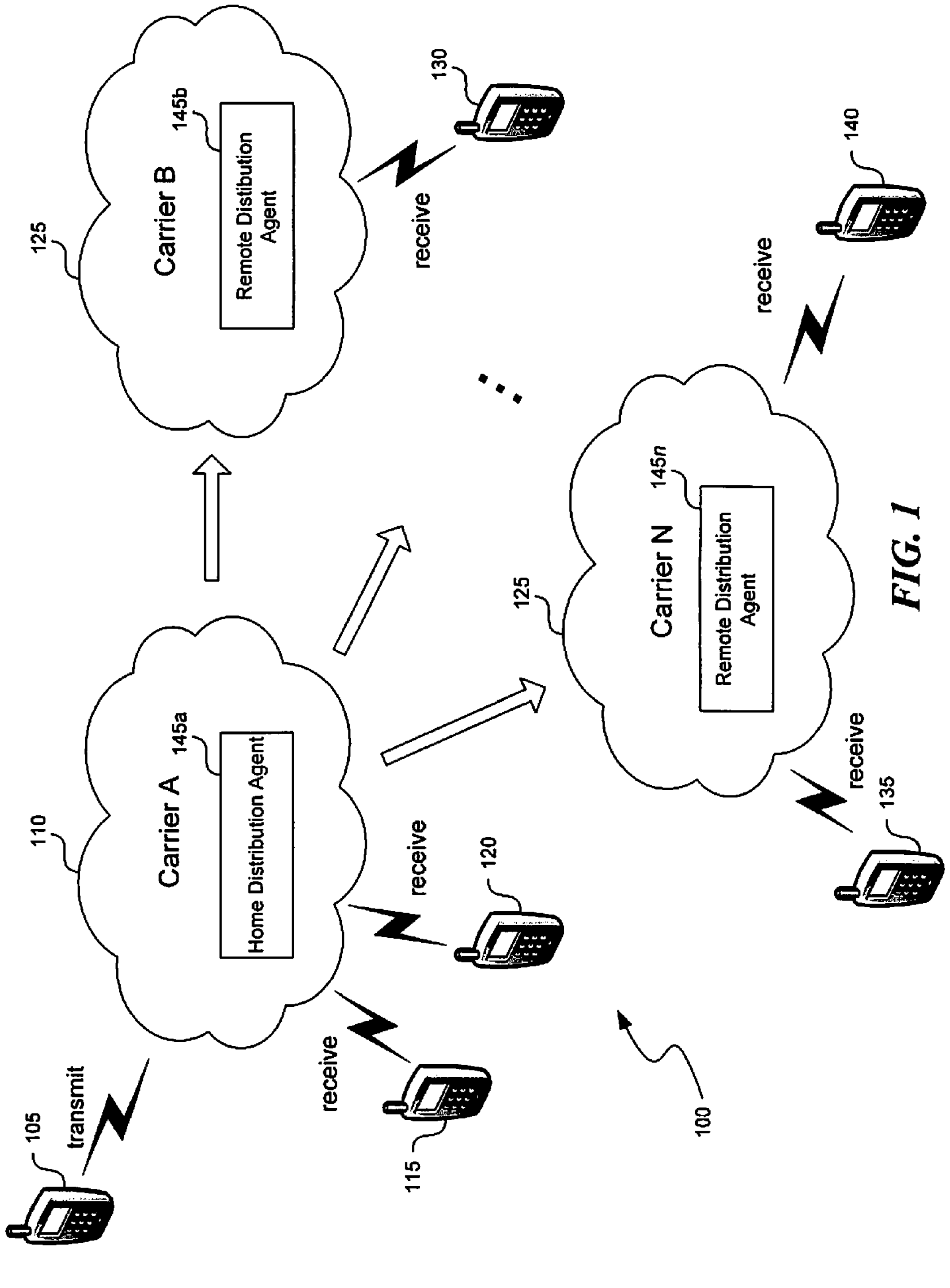
FIG. 1 is a block diagram of a representative environment in which group messages are routed by a distribution system to mobile devices that are serviced by different telecommunications carriers.

A system and method to enable the efficient distribution of group messages sent from a mobile device that receives service from one telecommunications carrier (the "home carrier"), to groups of mobile devices that receive service from one or more other telecommunications carriers ("remote carriers") is disclosed. A mobile device user or system operator generates a group distribution list for messages that are to be sent to two or more other users. The group distribution list is provided to a message distribution system that is comprised of distribution agents that are associated with each telecommunications carrier. As will be described in additional detail herein, each distribution agent is responsible for routing a group message to those mobile devices that receive service from the associated telecommunications carrier. That is, when a group message is sent by a user, the group message is routed by the home distribution agent to those mobile devices serviced by the home carrier. The group message is also transmitted by the home distribution agent to the appropriate remote distribution agents. Each remote distribution agent distributes the received message to the intended recipients. By distributing group distribution lists to remote distribution agents, and by having the home and remote distribution agents distribute to those recipients that are associated with the corresponding telecommunications carriers, the disclosed distribution system minimizes the message traffic between carriers and allows each telecommunications carrier to determine the most efficient manner to deliver messages to its users.

In some embodiments, the group distribution list is provided to a home distribution agent that is associated with the telecommunications carrier that provides service to the sender's mobile device. The group distribution list is stored as a master group identification record. The home distribution agent analyzes the master group identification record to identify intended recipients in the record that receive telecommunications service from other carriers. If the group identification record contains intended recipients that receive service from other carriers, the home distribution agent generates a partial group identification record for each carrier. Each partial group identification record contains a list that identifies those mobile devices that receive services from the corresponding carrier. Each partial group identification record is therefore a subset of the master group identification record. The home distribution agent transmits each partial group identification record to remote distribution agents that are incorporated in or associated with the other carriers. In this manner, the message distribution system is configured to enable group message delivery, with each remote distribution agent having only information about users serviced by the associated carrier.

In some embodiments, the master group identification record is provided to the home distribution agent and remote distribution agents. Each distribution agent analyzes the record, and distributes messages only to those mobile devices that are serviced by a telecommunications carrier associated with the distribution agent.

In some embodiments, the home distribution agent enables the user or system operator that created a group distribution list to update the group distribution list by adding, modifying, or deleting members of the list. If a user adds, modifies, or deletes a member of a group distribution list, the home distribution agent transmits updated distribution information to remote distribution agents. The updated distribution information may be transmitted to all remote distribution agents, or only to those distribution agents that are associated with an added, modified, or deleted member of a group.

In some embodiments, the group message is formatted in accordance with a mobile phone messaging standard such as, for example, the Short Message Service (SMS) or Multimedia Messaging Service (MMS) standards. In some embodiments, the group message is formatted according to an Instant Messaging (IM) standard (e.g. Session Initiation Protocol for Instant Messaging and Presence Leveraging Extensions, SIP SIMPLE, or Extensible Messaging and Presence Protocol, XMPP) to enable near real-time communication between three or more users.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of a representative environment 100 in which group messages are routed by a distribution system to recipients serviced by different telecommunications carriers. A user of a mobile device 105 or a system operator may generate a group distribution list that contains other mobile devices that can be designated to receive a message that is sent by a user. For example, a user may create a list of friends, family members, members of a club, members of a sports team, etc., to which the user would like to send common messages. As another example, a company may create a group distribution list for a company, for groups within the company, for employees in certain project teams, etc., that are to receive common messages. Mobile devices that are intended recipients of a message may receive service from a telecommunications carrier that is the same as the telecommunications carrier that provides service to the sending mobile device. For example, as depicted in FIG. 1, mobile device 105 receives service from a carrier 110 ("Carrier A"). Mobile device 105 may send a message to mobile devices 115 and 120 that also receive service from the same carrier 110. Mobile devices that are intended recipients of a message may also receive service from a telecommunications carrier that is different from the telecommunications carrier that provides service to the sending mobile device. For example, as depicted in FIG. 1, mobile device 105 may send messages to other devices serviced by different carriers 125, such as a mobile device 130 that receives service from Carrier B and mobile devices 135 and 140 that receive service from Carrier N. The group message may be formatted in accordance with a mobile phone messaging standard such as, for example, the Short Message Service (SMS) or Multimedia Messaging Service (MMS) standards.

To facilitate the distribution of group messages to recipient mobile devices, a distribution system is provided that is comprised of distribution agents 145*a*, 145*b*, . . . 145*n* that are each associated with a carrier. One distribution agent (the "home" distribution agent) is associated with the carrier providing service to the sending mobile device. As depicted in FIG. 1, if mobile device 105 acts as the sending device, the home distribution agent is distribution agent 145*a*. The other distribution agents 145*b* . . . 145*n* are associated with the carriers providing service to the recipient mobile devices. As will be described in greater detail herein, the contents of a group distribution list may be copied in whole or in part to all of the distribution agents 145*a*, 145*b*, . . . 145*n*. When a mobile device user sends a message to all members of the group distribution list, each distribution agent is responsible for ensuring that the message is forwarded to those mobile devices that receive service from the associated carrier. For example, if a user of mobile device 105 sends a message to a group that comprises mobile devices 120, 124, 130, 135 and 140, then distribution agent 145*a* for Carrier A ensures that that the message is forwarded to mobile device 102 and 125, distribution agent 145*b* for Carrier B ensures that the message is forwarded to mobile device 130, and distribution agent 145*n* for Carrier N ensures that the message is forwarded to mobile devices 135 and 140. Each distribution agent ensures that the message is forwarded by duplicating and sending the message itself or interacting with other carrier systems to ensure that the message is forwarded. By having each distribution agent ensure that messages are routed to those recipients that are associated with the corresponding telecommunications carrier, the disclosed distribution system minimizes the message traffic between carriers. For example, the disclosed distribution system only requires that a message be forwarded once from distribution agent 145*a* to distribution agents 145*b* . . . 145*n*. The disclosed distribution system also allows each telecommunications carrier to determine the most efficient manner to deliver messages to its users. For example, a message may be sent between carriers using an IM-based (e.g. SIP SIMPLE or XMPP) standard, but may be translated to other standards (e.g. SMS or MMS) by a distribution agent before distribution to its members.

Figure 2:
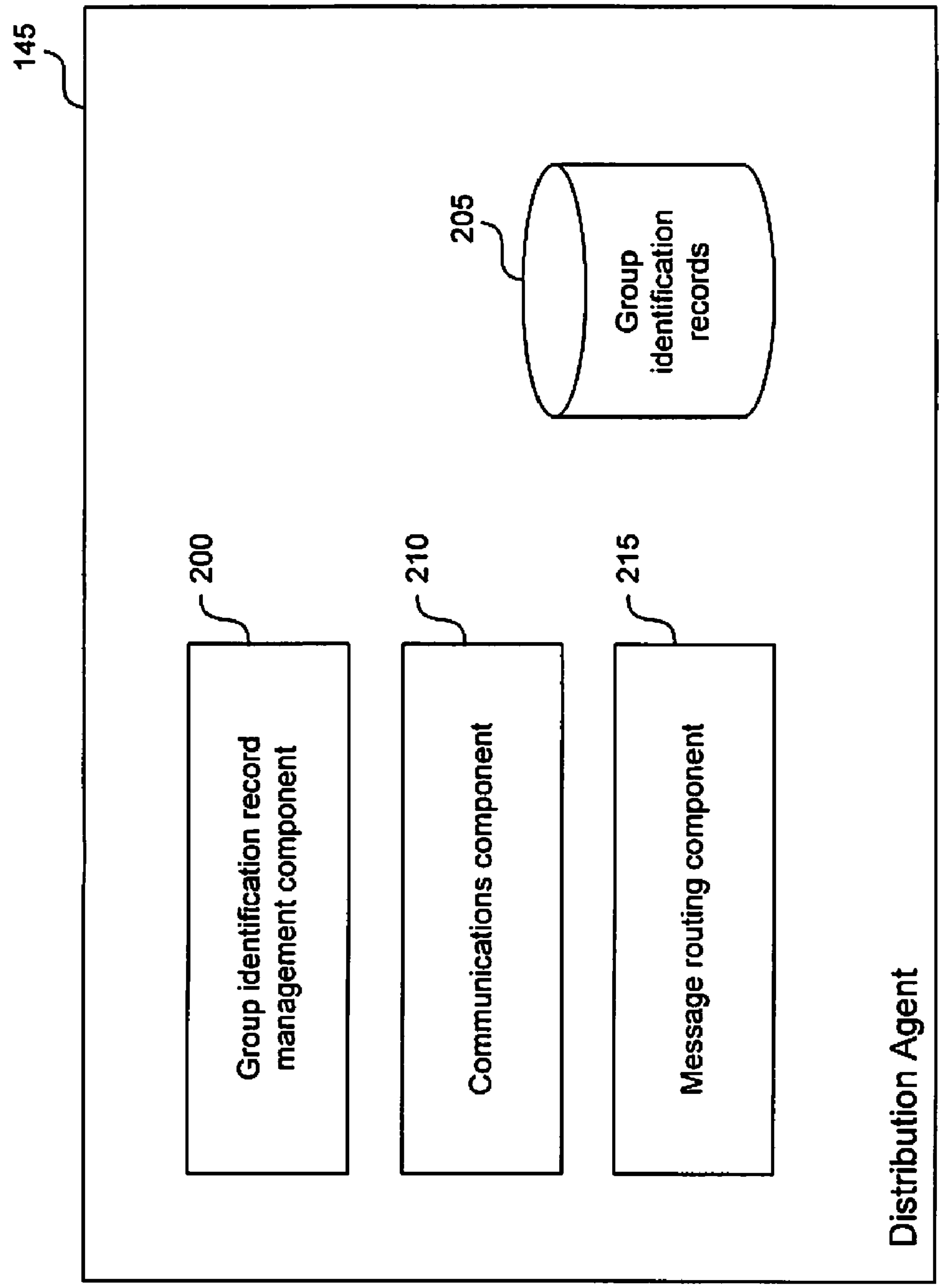
FIG. 2 is a block diagram of a distribution agent that operates to route messages to mobile devices that are serviced by a telecommunications carrier.

FIG. 2 is a block diagram of a distribution agent 145 that operates to distribute messages to mobile devices that are serviced by an associated telecommunications carrier. The distribution agent may be incorporated in or interact with other systems (now shown) in a telecommunications carrier's network that route messages between mobile devices. To implement the functionality described herein, the distribution agent contains a group management component 200. The group management component allows the user or system operator to define and manage the members of a group. As will be described in greater detail herein, based on a received group member list, the group management component manages the creation of one or more group identification records that are used by distribution agents to route messages. The group management component also manages the addition to, deletion from, or modification of the group identification records. The group identification records are stored by the distribution agent in a database or other data storage area 205. The distribution agent also contains a communications component 210 that interoperates with the telecommunication carrier systems to receive messages from, and cause messages to be transmitted to, mobile devices. The messages are routed in accordance with routing information contained in the group identification records. The distribution agent contains a message routing component 215 which interprets the group identification records in order to appropriately route the messages to group members.

In some embodiments, the distribution agent 145 may be implemented as an XML Document Management Server (XDMS) and the group identification records stored as shared XML documents. The group management component 200 may create, modify, or delete members of a group using commands formatted in the XML Configuration Access Protocol (XCAP), such as GET, PUT, and Delete. In some embodiments, the interface of the distribution agent may be exposed as a Representational State Transfer (REST) or SOAP (formerly known as 'Simple Object Access Protocol) interface in order to allow exchange of data. Those skilled in the art will appreciate that other implementations are, of course, possible.

Those skilled in the art will appreciate that the distribution agent 145 may be implemented on any computing system or device. Suitable computing systems or devices include server computers, multiprocessor systems, microprocessor-based systems, network devices, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Implementing software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. The functionality of the program modules may be combined or distributed across multiple computing systems or devices as desired in various embodiments.

Figure 3:
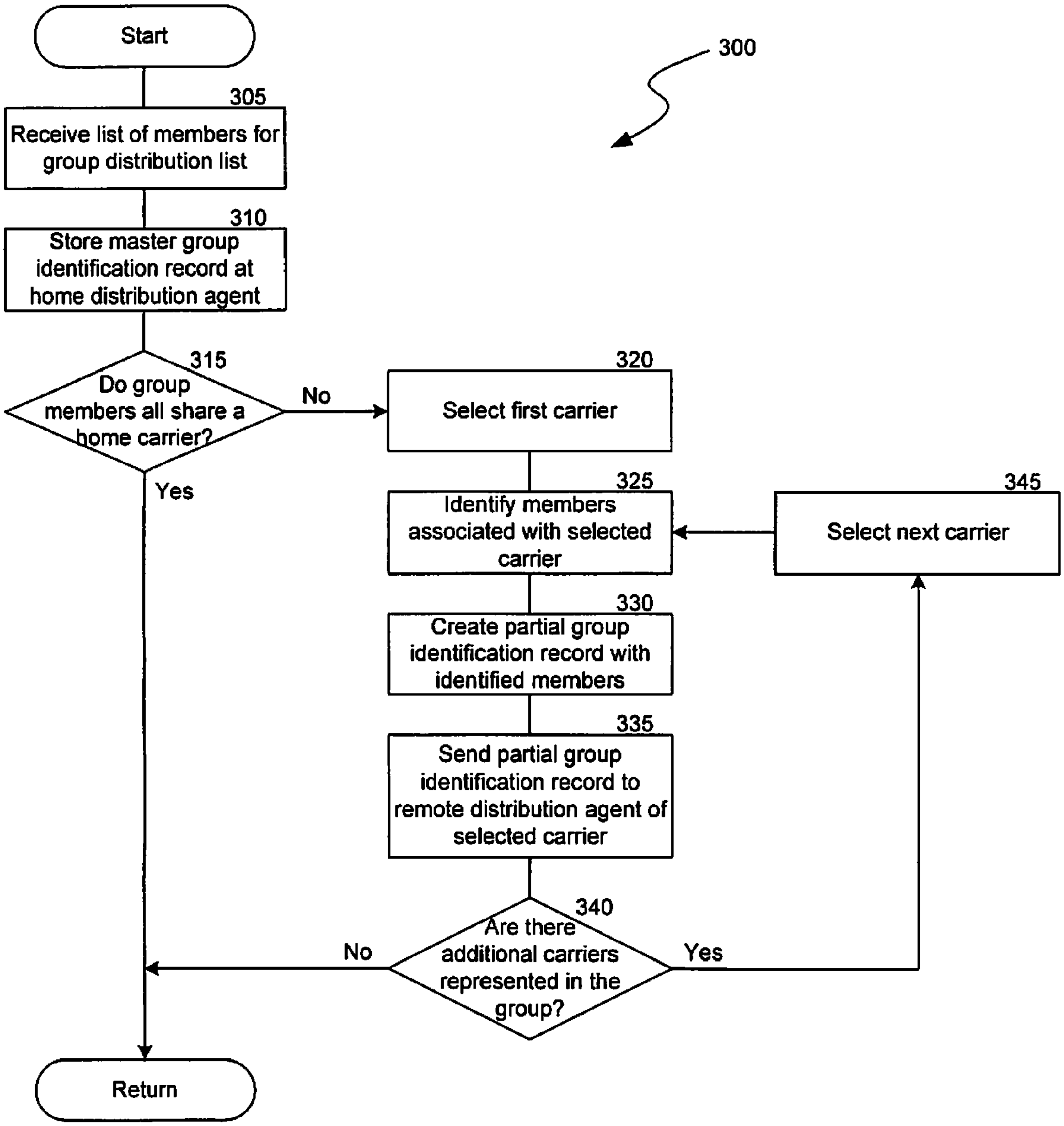
FIG. 3 is a flow chart of a process for distributing group routing information to distribution agents.

FIG. 3 is a flow chart of a process 300 for distributing group routing information to distribution agents 145*a*, 145*b*, . . . 145*n*. At a block 305, the home distribution agent receives a list of members that are to be included in a group distribution list. The list of members may be defined by a user or a system operator in a variety of ways. For example, the user may manually select two or more names and addresses from an address book that is accessible from the mobile device. As another example, the user may log-on to a website or other online interface that is provided by the user's carrier and select two or more names and/or addresses from the interface. As still another example, a system operator may manually enter names and contact information for members of a desired group. Other methods will be apparent to one skilled in the art to allow a user to specify members of a group distribution list. At a block 310, the home distribution agent stores a master group identification record that identifies all of the members in the group. The master group identification record includes the identity of the group members, an address used to route messages to each member, and a system-generated identifier to uniquely identify the group. The address of each member may have been provided by the user or system operator, or look-up tables or other databases may have been consulted to determine the address of each member. A representative table that contains a master group identification record 400 is provided in FIG. 4A. The first row of the table contains a group identifier 405. The group identifier may be an alpha, alphanumeric, numeric, or other code that is generated by the distribution agent and used to uniquely identify the group. The second row of the table contains a group nickname 410. The group nickname is typically assigned by the user that generated the group, and often is a name, acronym, or other title that allows the user to easily identify the distribution group for subsequent use. For example, the depicted example has the nickname "Volleyball Team," which reflects a group distribution list that might be used by a coach to send emails about games or practices to members of a volleyball team. Each of the subsequent rows in the table represents a member 415 of the defined distribution group. Each member is identified by a name 420 and a phone number, email address, IP address, or other address 425 that allows messages to be routed to the member. Each member is also identified by a carrier 430 that provides service to the mobile device used by the member. The home distribution agent determines the identity of the carrier providing service to the member by a query to a Number Portability Database (or equivalent such as ENUM service) if the member address is a phone number (in cellular networks a Mobile Subscriber ISDN Number), or to the Address and Routing Parameter Area (ARPA) if the member address is a Uniform Resource Identifier (URI) or a Session Initiation Protocol URI. For SIP URI or XMPP member addresses, the domain name (respectively such as sip:username@domain or xmpp:username@domain) may define where to route the message for distribution. To minimize the number of queries by the home distribution agent to remote databases, the routing information may be cached by the home distribution agent. The master group identification record stores sufficient information to allow the distribution system to route messages that are addressed to the group to each of the members of the group in the manner disclosed in greater detail herein.

Returning to FIG. 3, at a decision block 315, the home distribution agent determines whether all group members in the master group identification record are receiving service from the home carrier (i.e., the carrier that services the sending mobile device). If all group members share the same home carrier, then further distribution of group routing information to distribution agents ceases. Since all messages to the group will be routed by the home distribution agent, there is no additional need for the home distribution agent to distribute group identification records to other distribution agents.

If, however, at decision block 315 some of the group members in the master group identification record receive service from carriers other than the home carrier, then processing continues at a block 320. At block 320, the home distribution agent selects a first other carrier from the group distribution list. For example, in the example depicted in FIG. 4A the home distribution agent may select "Carrier B" for processing. At a block 325, the home distribution agent identifies all of the members of the group that receive service from the selected carrier. That is, the distribution agent parses the list of group members to identify all members that are served by the selected carrier. At a block 330, the home distribution agent creates a partial group identification record that is to be distributed to a remote distribution agent associated with the selected carrier. The partial group identification record contains sufficient information for the remote distribution agent to identify those group members that are serviced by the selected carrier. The partial group identification record is typically a subset of those members that are identified in the master group identification record 400. FIG. 4B depicts a representative table that contains a partial group identification record 450. In the depicted example, the partial group identification record only contains those members that are identified as receiving service from Carrier B. The first row of the table contains the group identifier 405, which is the unique code used to identify the group. The second row of the table contains the group nickname 410. The third row of the table contains a reference to the home distribution agent 455 where the master group identification record resides. As will be described in greater detail herein, the identity of the home distribution agent allows a message recipient to reply to a message and have the reply routed to the rest of the group. Each of the subsequent rows in the table represents a member 415 of the defined distribution group that receives service from the selected carrier. Each member is identified by a name and a phone number, email address, IP address, or other address that allows messages to be sent to the member.

Returning to FIG. 3, at a block 335, the home distribution agent sends the partial group identification record to the remote distribution agent associated with the selected carrier. The partial group identification record stores sufficient information to allow the remote distribution agent to route messages that are addressed to the group to each member serviced by the associated carrier. The home distribution agent is responsible for the successful delivery of the partial group identification records to the remote distribution agents. In some cases, to ensure reliable service, the home distribution agent may implement a store-and-forward mechanism (e.g. for SMS or MMS) to ensure that delivery occurs.

At a decision block 340, the home distribution agent determines whether there are additional carriers associated with members of the distribution group. If there are no additional carriers, further distribution of group routing information to distribution agents ceases. If there are additional carriers associated with members of the distribution list, processing continues at a block 345. At block 345, the home distribution agent selects the next carrier for processing. For example, in the example depicted in FIG. 4A the home distribution agent may select "Carrier C" for processing. The processing in blocks 325-335 is then repeated to create and send a partial group identification record to the selected carrier. For example, FIG. 4C depicts a representative table that contains a partial group identification record 470 for Carrier C. The partial group identification record 470 contains a list of those members that receive service from Carrier C that are identified in the master group identification record 400.

At decision block 340, the home distribution agent again determines whether there are additional carriers associated with members of the distribution group. If there are no additional carriers, further distribution of group routing information to distribution agents ceases. One of the advantages of the disclosed distribution system is that the group identification records that are used by the distribution system to route group messages only need to be provided to those distribution agents that will actually route a message. In addition to reducing the size and number of messages transmitted between carriers, it also preserves the confidentiality of member information for members that are associated with other carriers.

Figure 5:
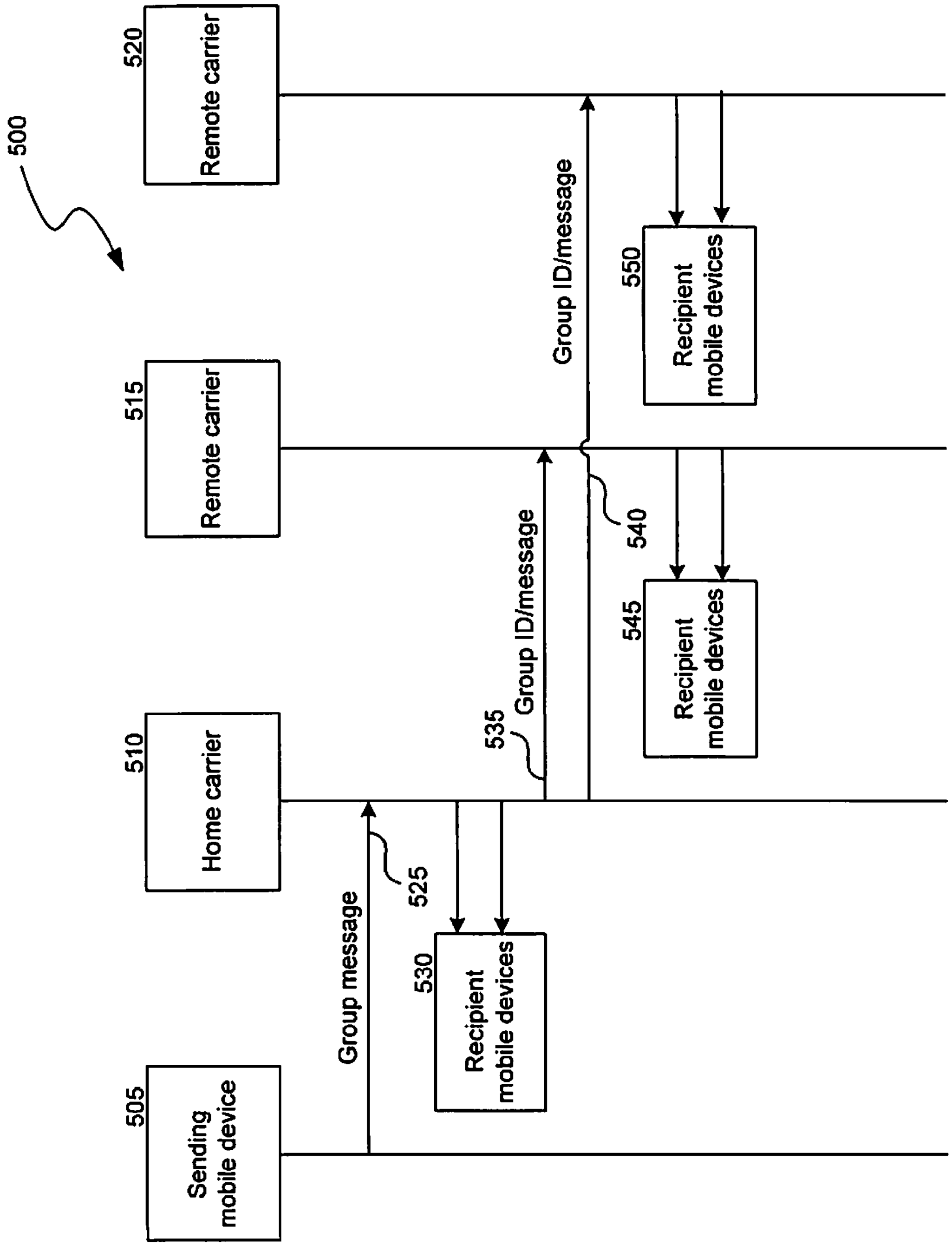
FIG. 5 is a signaling diagram that depicts inter-carrier messaging when a group message is being routed to recipient mobile devices.

Once group routing information has been distributed to the distribution agents, the distribution system is prepared to route group messages from a sender to multiple recipients. FIG. 5 is a signaling diagram 500 that depicts inter-carrier and carrier-to-mobile device messaging when group messages are being routed from a sending mobile device to recipient mobile devices. A sending mobile device 505 initially sends a message 525 that is addressed to a group of recipients. The message is received by a home carrier 510, and the distribution agent associated with the home carrier compares the received message with the stored master group identification records to identify the appropriate master group identification record and determine routing information for the group members. For those members of the group that are serviced by the home carrier, the distribution agent causes the message to be replicated and sent to the recipient mobile devices 530. For those members of the group that are serviced by remote carriers, the home distribution agent causes the message and the group identifier to be forwarded to the appropriate remote distribution agent. For example, the home distribution agent sends a first message 535 to a distribution agent at a first remote carrier 515 and a second message 540 to a distribution agent at a second remote carrier 520. The first and second messages contain the group identifier and the message (including the identity of the sender) that is to be delivered to recipient group members. The distribution agent at the first remote carrier 515 receives the message, analyzes the received group identifier to identify the appropriate remote identification record, and causes the message to be delivered to recipient mobile devices 545 that are contained in the identified remote identification record. Similarly, the distribution agent at the second remote carrier 520 receives the message, analyzes the received group identifier to identify the appropriate remote identification record, and causes the message to be delivered to recipient mobile devices 550 that are contained in the identified remote identification record. (For offline members, the messages may be archived for subsequent delivery.) In this fashion, the group message sent by the sending device 505 is distributed to all recipient mobile devices, while minimizing the number of messages that are sent between carriers. Moreover, each carrier is provided individual control over the manner in which group messages are distributed in its own network.

Figure 6:
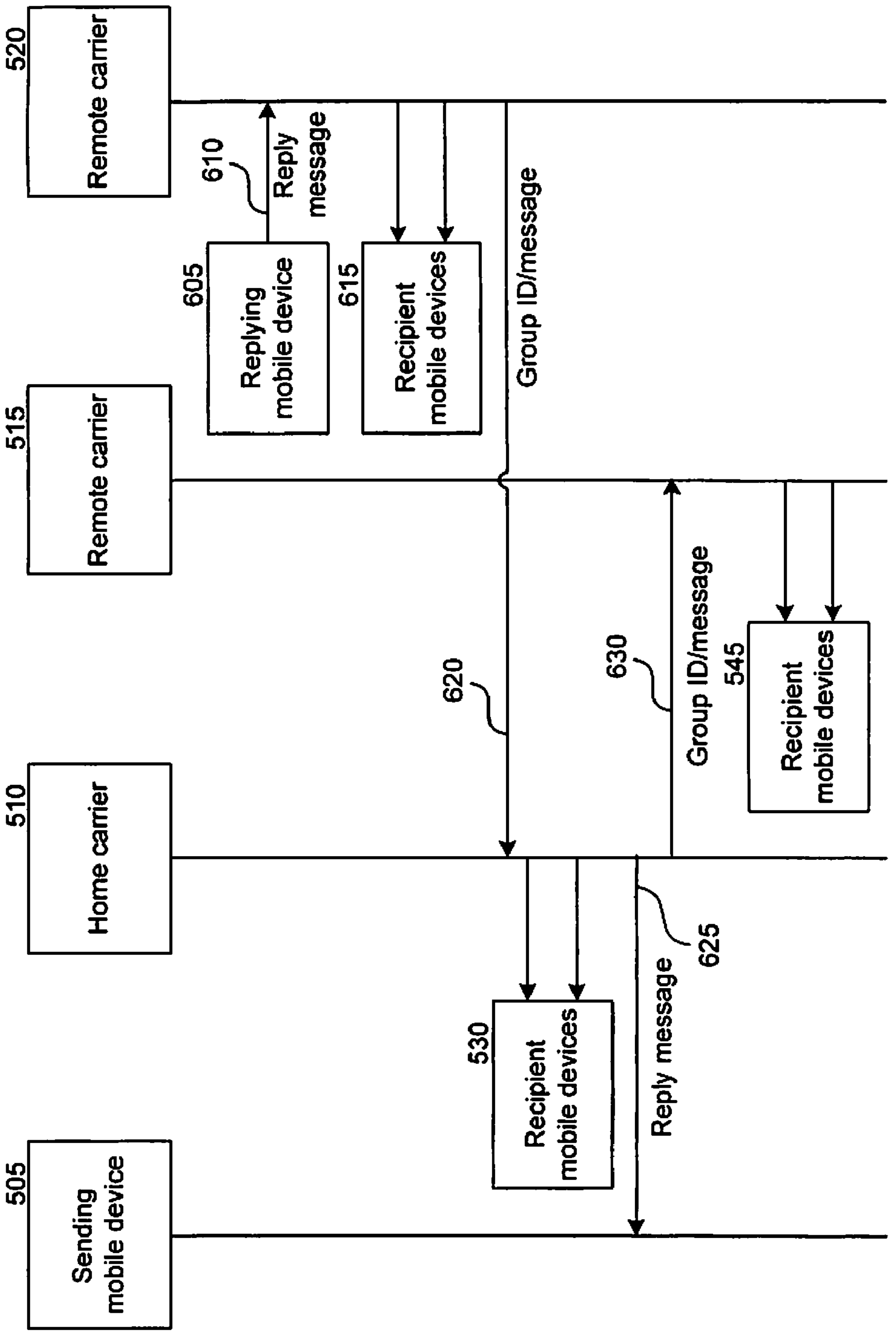
FIG. 6 is a signaling diagram that depicts inter-carrier messaging when a reply to a group message is being routed to recipient mobile devices.

When a recipient of a group message responds to the message, the group identification records can similarly be used to route the reply message to the group members. FIG. 6 is a signaling diagram 600 that depicts inter-carrier messaging when a reply message is sent to a group message. A replying mobile device 605 initially sends a reply message 610 in response to a group message. The message is received by the remote carrier 520, and the distribution agent associated with the remote carrier compares the received message with the partial group identification record to determine routing information. For those members of the group that are serviced by the remote carrier 520, the distribution agent causes the message to be replicated and sent to the recipient mobile devices 615. Since the partial group identification record does not contain a record of users serviced by other carriers, the remote distribution agent sends a message 620 to the home distribution agent. The message 620 contains the group identifier and the message (including the identity of the replier) that is to be delivered to the group members. The message is received by the distribution agent associated with the home carrier 510. The home distribution agent uses the group identifier to locate the corresponding master group identification record and determine routing information for those group members not serviced by remote carrier 520. For those members of the group that are serviced by the home carrier, the home distribution agent causes the message to be replicated and sent to the recipient mobile devices 530. The distribution agent also causes a reply message 625 to be replicated and sent to the original sending mobile device 505. For those members of the group that are serviced by remote carriers, the home distribution agent causes the message and the group identifier to be forwarded to the appropriate remote distribution agent. For example, the home distribution agent sends a message 630 to the distribution agent at the first remote carrier 515. The distribution agent at the first remote carrier 515 receives the message, analyzes the received group identifier to identify the appropriate remote identification record, and causes the message to be delivered to recipient mobile devices 545 that are contained in the identified remote identification record. In this fashion, the reply message sent by the replying mobile device

605 is distributed to all members of the group, while minimizing the number of messages that are sent between carriers.

Figure 7:
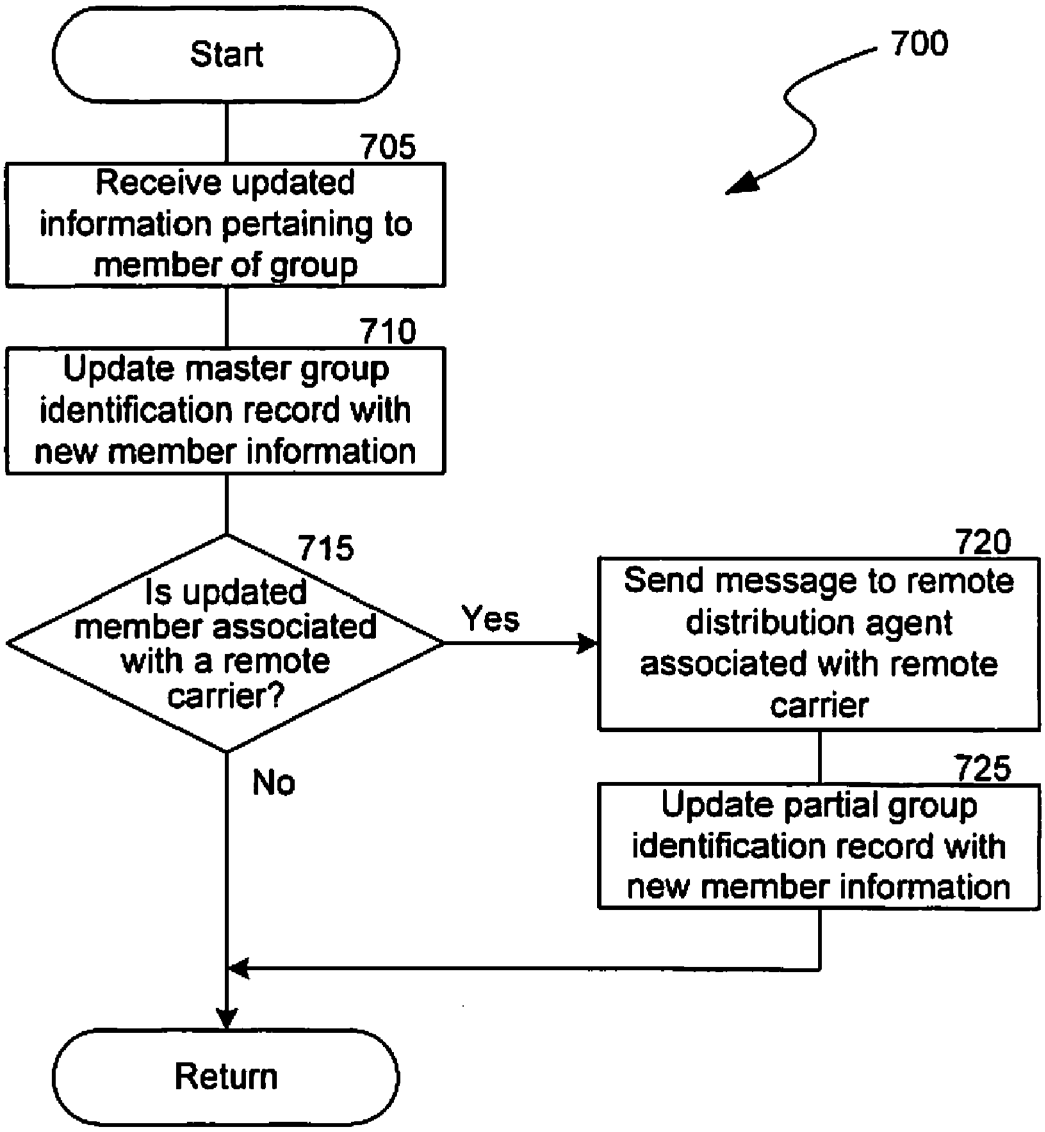
FIG. 7 is a flow chart of a process for updating group routing information at home or remote distribution agents.

As described herein, the distribution agents rely on group identification records to route messages to members of a group. It will be appreciated that groups may not be static, however, and that group members may be added, removed, or modified. FIG. 7 is a flow chart of a process 700 for updating group identification records that are stored at home or remote distribution agents. At a block 705, the home distribution agent receives updated information pertaining to a member of a group. The updated information may be received, for example, from a user that created the group list or from a system operator. Change requests are forwarded to the home distribution agent since the home distribution agent manages the master group identification record. At a block 710, the home distribution agent updates the master group identification record with the new member information. At a decision block 715, the home distribution agent determines whether the updated information pertains to a member that receives service from a remote carrier. If the updated member doesn't receive service from a remote carrier (i.e., the updated member receives service from the home carrier), then no further updating of group identification records is necessary and the process terminates. If the updated member receives service from a remote carrier, then processing continues to a block 720. At block 720, the home distribution agent sends a message to the remote distribution agent associated with the remote carrier. The message may contain updated member information that needs to be applied to the partial group identification record, or the message may simply contain a new partial group identification record for the remote distribution agent. At a block 725, the remote distribution agent receives the changed member information, and updates the partial group identification record to reflect the changed member information. By propagating member changes to the appropriate distribution agent, the distribution system ensures that group messages will be accurately routed to the intended recipients. For SMS and MMS, short codes may be used as a destinator and mapped to a group identificator in the home carrier's network.

The operation of the distribution system has been described so far in the context of sending SMS or MMS formatted messages between mobile devices. In some embodiments, it may be desired to implement instant messaging between members of a group. For example, it may be beneficial for instant message (IM) communication to be enabled to allow near real-time communication between three or more users. In such cases, the distribution system and method disclosed herein may be appropriately modified to facilitate the real-time communication. For example, an IM session may be constructed using Push over Cellular (PoC) where the group ID is contained in the destination URI. In this case, SIP sessions are created between the distribution agents and group members (and torn down later on). The same mechanism may be used for session-based IM relying on SIP SIMPLE, that is SIP sessions may be created between the distribution agents and group members and subsequently torn down. In contrast, for pager-mode IM relying on SIP SIMPLE, no SIP sessions are created. A group message is forwarded to each remote distribution agent serving members of the group. The same mechanism can be applied for other instant messaging technologies such as XMPP; however TCP sessions need to be open between the distribution agents and members of the groups.

The distribution system described herein relies upon a master group identification record being maintained at the home distribution agent, and partial group identification records being maintained at the remote distribution agents. In some embodiments, however, the master group identification record may be distributed to all remote distribution agents 145*a*, 145*b*, . . . 145*n*. If the master group identification record is distributed to all remote distribution agents, each distribution agent would be responsible for parsing the master group identification record in order to identify and deliver messages to those mobile devices that receive service from the associated carrier. Moreover, if any change is made to the group distribution list, such as by adding, deleting, or modifying a member of the group, the distribution system would need to update the master group identification record that is maintained at each distribution agent. Further modifications to the processes described herein when a master group distribution record is distributed to all remote distribution agents will be readily apparent to one skilled in the art.

From the foregoing, it will be appreciated that specific embodiments of the invention have been described herein for purposes of illustration, but that various modifications may be made without deviating from the spirit and scope of the invention. For example, while FIGS. 4A-4C depict tables whose contents and organization are designed to make them more comprehensible by a human reader, those skilled in the art will appreciate that the actual data structure(s) used by the facility to store this information may differ from the tables shown, in that they, for example, may be organized in a different manner, may contain more or less information than shown, may be compressed and/or encrypted, and may be optimized in a variety of ways. As another example, although the identity of carriers are depicted as being stored in the master identification record with each group member, it will be appreciated that the carrier information may be determined at the time of analysis by the home distribution agent or at another time. As still another example, although the phrase "telecommunications carrier" is used throughout, the telecommunications carrier may be an internet service provider or other service provider to a mobile device. Accordingly, the invention is not limited except as by the appended claims.

We claim:

1. A distribution system for the delivery of a message received from a sending mobile device and intended to be distributed to a plurality of recipient mobile devices, the sending mobile device and at least one of the plurality of recipient mobile devices receiving service from different telecommunications service providers, the distribution system comprising:

- a home distribution agent associated with a first telecommunications service provider, the home distribution agent configured to:
  - receive from a sending mobile device a message that is intended for distribution to a plurality of recipient mobile devices;
  - maintain a master routing record that comprises addressing information necessary to route the message to all of the plurality of recipient mobile devices;
  - based on the master routing record, identify one or more other telecommunications service providers that provide service to the plurality of recipient mobile devices; and
  - transmit one message per identified other telecommunications service provider to initiate the sending of the message to recipient mobile devices that receive service from the identified other telecommunications service provider; and
- one or more remote distribution agents each associated with a different telecommunications service provider and each configured to:

maintain a partial routing record that comprises addressing information necessary to route a message to a subset of the plurality of recipient mobile devices that receive service from the associated telecommunications service provider; and receive the one message from the home distribution agent and based on the partial routing record cause the message to be routed to the subset of the plurality of recipient mobile devices;

wherein the home distribution agent is further configured to modify routing information by:

receiving a modification to the plurality of recipient mobile devices;

identifying a telecommunications service provider that provides service to a recipient mobile device associated with the modification; and transmitting an indication of the modification to the remote distribution agent associated with the identified telecommunications service provider; and the one or more remote distribution agents are each further configured to receive an indication of a modification and update the partial routing record to reflect the modification.

2. The distribution system of claim 1, wherein the plurality of recipient mobile devices is defined by a user of the sending mobile device.

3. The distribution system of claim 1, wherein the plurality of recipient mobile devices is defined by an operator of the distribution system.

4. The distribution system of claim 1, wherein the message is formatted in accordance with a messaging standard.

5. The distribution system of claim 4, wherein the messaging standard is a Short Message Service (SMS) standard, a Multimedia Messaging Service (MMS) standard, or an Instant Messaging standard.

6. The distribution system of claim 1, wherein the modification is an addition of a recipient mobile device.

7. The distribution system of claim 1, wherein the modification is a deletion of a recipient mobile device.

8. The distribution system of claim 1, wherein the modification is a change to a recipient mobile device.

9. The distribution system of claim 1, wherein the home distribution agent further causes the received message to be routed to a subset of the plurality of recipient mobile devices that receive service from the first telecommunications service provider.

10. A method of routing a message from a sending mobile device to two or more recipient mobile devices, at least one of the recipient mobile devices receiving service from a different telecommunications carrier than the telecommunications carrier that provides service to the sending mobile device, the method comprising:

receiving an identification of a group of recipient mobile devices, the group of recipient mobile devices receiving service from two or more telecommunications carriers;

distributing addressing information associated with the group of recipient mobile devices to a plurality of distribution agents, each of the plurality of distribution agents associated with one of the two or more telecommunications carriers, and each of the plurality of distribution agents receiving addressing information associated with recipient mobile devices that receive service from the associated telecommunications carrier;

receiving a message from a sending mobile device, the message being intended for delivery to the group of recipient mobile devices; and routing the message for delivery to the group of recipient mobile devices by:

for recipient mobile devices that receive service from the telecommunications carrier associated with the sending mobile device, distributing the message to the recipient mobile devices in accordance with the received addressing information; and for recipient mobile devices that do not receive service from the telecommunications carrier associated with the sending mobile device, transmitting a single message to the distribution agent associated with each telecommunications carrier, the single message causing the distribution agent to distribute the message to the recipient mobile devices that receive service from the associated telecommunications carrier in accordance with the received addressing information; and in the event of the receipt of a modification to the group of recipient mobile devices:

identifying one of the plurality of distribution agents associated with the modification; and transmitting an indication of the modification to the identified distribution agent, wherein the identified distribution agent receives the indication of the modification and updates the received addressing information.

11. The method of claim 10, wherein the group of recipient mobile devices is received from a user of a sending mobile device.

12. The method of claim 10, wherein the group of recipient mobile devices is received from an operator of a telecommunications carrier.

13. The method of claim 10, wherein the message is formatted in accordance with a messaging standard.

14. The method of claim 13, wherein the messaging standard is a Short Message Service (SMS) standard, a Multimedia Messaging Service (MMS) standard, or an Instant Messaging standard.

15. The method of claim 10, wherein the modification is an addition of a recipient mobile device.

16. The method of claim 10, wherein the modification is a deletion of a recipient mobile device.

17. The method of claim 10, wherein the modification is a change to a recipient mobile device.

* * * * *